United States Patent [19]

Albrecht et al.

[11] Patent Number: 4,537,641
[45] Date of Patent: Aug. 27, 1985

[54] PROCESS FOR PRODUCING VALVE-METAL ANODES FOR ELECTROLYTIC CAPACITORS

[75] Inventors: Wolf-Wigand Albrecht; Axel Hoppe, both of Bad Harzburg; Uwe Papp, Goslar; Rudiger Wolf, Vienenburg, all of Fed. Rep. of Germany

[73] Assignee: Hermann C. Starck Berlin, Berlin, Fed. Rep. of Germany

[21] Appl. No.: 590,740

[22] Filed: Mar. 16, 1984

[30] Foreign Application Priority Data

Mar. 18, 1983 [DE] Fed. Rep. of Germany ....... 3309891

[51] Int. Cl.$^3$ ............................................... H01G 9/05
[52] U.S. Cl. .......................... 148/11.5 P; 75/0.5 BB; 148/11.5 F
[58] Field of Search ............... 75/0.5 BB; 148/11.5 P, 148/11.5 F, 126

[56] References Cited

U.S. PATENT DOCUMENTS

| 3,647,415 | 3/1972 | Yano et al. | 75/0.5 BB |
| 3,829,310 | 8/1974 | Mahy | 75/0.5 BB |
| 4,084,965 | 4/1978 | Fry | 75/0.5 BB |
| 4,231,790 | 11/1980 | Hähn et al. | 75/0.5 BB |

FOREIGN PATENT DOCUMENTS

| 354785 | 8/1931 | United Kingdom . |
| 698753 | 10/1953 | United Kingdom . |
| 735085 | 8/1955 | United Kingdom . |
| 798750 | 7/1958 | United Kingdom . |
| 1247410 | 9/1971 | United Kingdom . |

*Primary Examiner*—Wayland Stallard
*Attorney, Agent, or Firm*—Ladas & Parry

[57] ABSTRACT

To produce valve-metal anodes for electrolytic capacitors, reducing agents are added to the already sintered and/or unsintered anode bodies to improve the electrical properties, whereupon heating is carried out at temperatures above the melting point of the reducing agents and below the temperatures conventionally used for sintering the valve-metal anodes.

10 Claims, No Drawings

PROCESS FOR PRODUCING VALVE-METAL ANODES FOR ELECTROLYTIC CAPACITORS

The invention relates to a process for producing valve-metal anodes for electrolytic capacitors to improve the electric properties of valve-metal anodes.

Attempts were made in the past, by means of a wide variety of measures, to improve the electrical properties of valve-powders, preferably tantalum metal powders, which are used to produce electrolytic capacitors. These efforts were aimed at increasing the specific charge, improving the breakdown resistance and, as a result, increasing the activating and operating voltage, and reducing the residual or leakage current and the loss angle when the capacitor operates on alternating voltage.

These measures involved primarily the use of increasingly large-surface tantalum powders of which very high purity requirements were also demanded. Because of the simultaneous reduction in the necessary temperatures during high-vacuum sintering to which the porous pressed articles produced from the powders had to be exposed, again in terms of useful valve-metal surface was achieved because sintering of the particles decreased.

It was even proposed to produce anodes from valve metals without a sintering process. In this respect, for example German Offenlegungsschrift No. 2,361,197* makes known a process in which unsintered anodes are produced with additives which serve as lubricants during pressing and which increase the mechanical strength of the unsintered "green" valve-metal anode bodies. The test examples listed in the German Offenlegungsschrift mentioned demonstrate a considerable gain in terms of specific charge in comparison with sintered anodes.
*(U.S. Pat. No. 4,041,359)

However, the latter process has not proved acceptable, in practice, to capacitor manufacturers, because the activating and working voltages conventionally required for valve-metal electrolytic capacitors cannot be obtained with unsintered anodes. It is pointed out, in this respect, that the higher the working voltage of the valve-metal capacitor, the higher the sintering temperatures which generally have to be used. This in turn means a considerable loss of active surface in the porous sintered body and consequently a loss of specific charge.

Attempts were also made, by means of various additions during or after the preparation of the valve-metal powder for the purpose of "doping" the metal, to exert a favourable influence on the metal surface so as to achieve better electrical properties.

Furthermore, Albrecht et. al. U.S. Ser. No. 339,522 filed July 19, 1982, now U.S. Pat. No. 4,483,819 corresponding to German Offenlegungsschrift No. 3,130,392 describes measures which serve the above-mentioned purposes of surface treatment of tantalum powders by the addition of reducing metals before the agglomeration or before the shaping of the pressed tantalum-powder articles (anodes) as somewhat higher leakage current occurring in the tantalum capacitor in the latter case.

The object of the invention is, therefore, to provide a process which eliminates the disadvantages mentioned and in a simple way makes it easier to process valve-metal powders and which at the same time noticeably improves the electrical properties obtainable according to the state of the art in valve-metal anodes, that is to say, whilst ensuring a maximum obtainable specific charge, as high an activating and working voltage of the valve-metal electrolytic capacitor as possible is guaranteed.

This object is achieved, according to the invention, by means of subsequent thermal treatment of already sintered or even unsintered valve-metal anode bodies in a high vacuum or under an inert-gas atmosphere, in the presence of reducing metals, at temperatures above the melting point of the reducing metals and below the conventional temperatures used in the sintering or valve-metal anodes. Preferably, quantities of 0.1 to 2% by weight of reducing metals, relative to the weight of the valve-metal anodes used, are added, and temperatures in the range of 600° C. to 1,200° C. are preferably employed. Alkali metals and alkaline-earth metals as well as aluminium are suitable as reducing metals for carrying out the process according to the invention. Calcium, magnesium or aluminium are preferably used.

It was found surprisingly that this simple subsequent thermal treatment of the already finished anodes or the "green" sintered anodes pressed into shape, which can be produced according to a known process, has a very favourable effect on the breakdown voltage, the leakage current and the maximum activating voltage, without the specific surface of the valve-metal anode and consequently the specific charge being noticeably impaired as a result of these measures. It will, as a rule, be advisable, particularly when reducing metals are used in the medium and higher concentration ranges, to remove the reaction products arising from the subsequent thermal treatment by means of subsequent chemical treatment using aqueous mineral-acid solutions and by means of subsequent neutral washing of the purified sintered anodes, in order on the one hand to increase the purity of the surfaces, but also on the other hand to restore the original porosity of the anode bodies, since it must be assumed that the precipitation of reaction products arising from the process according to the invention within the porous pressed article reduces the inner surface and consequently leads to a loss of specific charge in the capacitor.

TEST EXAMPLE

Test 1

A series of already sintered tantalum anodes from a conventional production process was thermally treated with the addition of 0.5% by weight of magnesium chips in a boat made of sheet tantalum for approximately 9 hours at 850° C. within a retort oven under a protective-gas atmosphere (argon). After this treatment, the anodes were further purified with a semi-concentrated aqueous hydrochloric acid and subsequently with distilled water and, together with untreated anodes, were activated electrolytically and measured electrically. The measurement results are compared in Table 1, and they show a clear increase in the breakdown voltage and, corresponding to this, a noticeably lower leakage current (residual current) of the anodes treated according to the invention (1A) in comparison with the untreated anodes (1B).

Test 2

Tantalum anodes consisting of a high-capacitance tantalum-metal powder, such as produced, for example, according to the process described in German Offenlegungsschrift No. 3,130,392, were sintered at 1,500° C. for 30 minutes in a high vacuum. These careful sintering conditions resulted in high-capacitance tantalum anodes for only low working voltages of the tantalum capacitor. The sintered anodes treated according to the invention in accordance with Example 1 were again purified chemically and activated electrolytically. The results of the electrical test are set out likewise in Table 1 under No. 2A. The comparative measurement of the corresponding untreated anodes bears the serial number 2B.

Test 3

A test with unsintered anodes was conducted as a further attempt to use the subsequent treatment according to the invention of valve-metal anodes. For this purpose, cylindrical tantalum anodes consisting of an agglomerated tantalum-metal powder (sodium-reduced) with a diameter of 3.2 mm, a length of 4.2 mm and a pressed density of 6 g/cm$^3$ were produced by means of an inserted lead wire made of tantalum. One half of this batch was subjected, according to test Example 1, to the thermal and subsequent chemical treatment according to the invention. The results of this test are set out in Table 1 under Nos. 3A and 3B.

Test 4

Test 3 was repeated, but this time the tantalum-metal powder had been produced in a known way from an electron-beam-melted ingot (so-called "EB"—Electron Beam Melting Grade). The test results of this test are designated in Table 1 by numbers 4A (treated) and 4B (untreated).

strikingly documented in all the measurement results of the Table, in the samples given under A, as a noticeable increase in the breakdown voltage in the activated valve-metal anodes, whilst the samples designated by B represented the state of the art. The effect mentioned is accompanied by a reduction in the residual current (leakage current) in the valve-metal capacitor produced from an anode subsequently treated according to the invention.

Thus, it can be seen from Examples 1 and 2 that as a result of the process according to the invention the maximum activating voltage for anodes produced according to the state of the art can be increased markedly, for example, in the present cases, from 70 to 140 volts.

Insofar as unsintered tantalum anodes are subsequently according to the invention with reducing-metal vapours, an additional increase in the specific charge is obtained, and this can possible be explained by the fact that the intermetallic contact bridges between the metal-powder particles are reinforced and consequently increase the effective capacitor surface. As regards anodes which are already sintered, this additional effect is, of course, not obtained by the measure according to the invention, as already mentioned in the introduction.

It may be presumed that the advantage of the process according to the invention can be derived from a change in the amorphous or crystalline structure of the oxide film on the valve-metal surface.

Although the invention has only been described with respect to the production of valve-metal anodes from tantalum powder, the invention is also applicable to other valve metal powders, particularly tantalum hydride, or doped tantalum.

TABLE 1

| | Electrical test of valve-metal anodes Results A according to the process of the invention Results B according to the state of the art | | | | | | | | | |
|---|---|---|---|---|---|---|---|---|---|---|
| Test No. | 1A | 1B | 2A | 2B | 3A | 3B | 4A | 4B | 5A | 5B |
| Specific charge (mC/g) | 14.20 | 14.35 | 18.90 | 18.94 | 27.3 | 22.5 | 5.65 | 5.41 | 7.58 | 7.66 |
| Relative leakage current (nA/μC) | 0.12 | 0.4 | 0.25 | 0.32 | 0.5 | 2.5 | 0.33 | 1.1 | 0.42 | 0.9 |
| Breakdown voltage (Volts) | 195 | 140 | 155 | 115 | 120 | 85 | 135 | 108 | 163 | 125 |
| Maximum activating voltage (Volts) | 140 | 70 | 140 | 70 | 40 | 40 | 100 | 100 | 60 | 60 |

Activation in 0.01% of H$_3$PO$_4$ at 90° with 35 mA/g, activation time: 2 hours
Measurements in 10% of H$_3$PO$_4$; breakdown measurement at 90° C. in 1% H$_3$PO$_4$

Test 5

Niobium was used as a valve metal in a further possibility of applying the process according to the invention. Here, anodes were produced from an EBM niobium-metal powder by pressing the latter with a green density of 4.5 g/cm$^3$ and by sintering the pressed article at 1,500° C. Some of the niobium anodes were subsequently treated thermally for approximately 5 hours at 850° C. with calcium-metal vapours under a protective gas (argon) and were washed in an already known way with hydrochloric acid and distilled water. Electrical measurement was carried out in comparison with the untreated anodes. The results are demonstrated in Table 1 under numbers 5A and 5B.

The activating voltages indicated in Table I (see appendix) in columns 1A to 2B are the maximum permissable activating voltages, above which a clear increase in the leakage current can be detected.

The advantage of the subsequent thermal treatment according to the invention of valve-metal anodes is

We claim:

1. A process for producing a valve-metal anode for electrolytic capacitors which comprises heating under a high vacuum or under an inert gas atmosphere a previously heat-treated, shaped and pressed mass of valve-metal powder in the presence of a reducing metal at a temperature above the melting point of the reducing metal and below a temperature conventionally used for sintering a valve-metal anode.

2. A process according to claim 1, wherein the heating is carried out at a temperature below 1600° C.

3. A process according to claim 2, wherein the heating is carried out at a temperature between about 650° C. and about 1150° C.

4. A process according to claim 3, wherein the reducing metal is an alkali metal.

5. A process according to claim 3, wherein the reducing metal is an alkaline earth metal.

6. A process according to claim 3, wherein the reducing metal is aluminum.

7. A process according to claim 4, wherein the reducing metal is magnesium, calcium or magnesium and calcium.

8. A process according to claim 1, wherein the previously heat-treated, shaped and pressed mass of valve-metal powder has been agglomerated.

9. A process according to claim 1, wherein the previously heat-treated, shaped and pressed mass of valve-metal power has been sintered.

10. A process according to claim 1, wherein the valve metal powder comprises tantalum, tantalum hydride or doped tantalum.

* * * * *

UNITED STATES PATENT AND TRADEMARK OFFICE
CERTIFICATE OF CORRECTION

PATENT NO. : 4,537,641

DATED : August 27, 1985

INVENTOR(S) : WOLF-WIGAND ALBRECHT ET AL

It is certified that error appears in the above-identified patent and that said Letters Patent is hereby corrected as shown below:

Claims 4, 5 and 6, line 1 of each, substitute --1-- for "3"

Claim 7, line 1, substitute --5-- for "4"

Signed and Sealed this

Fourth Day of March 1986

[SEAL]

Attest:

DONALD J. QUIGG

Attesting Officer

Commissioner of Patents and Trademarks